US011138591B2

(12) United States Patent
Salama et al.

(10) Patent No.: US 11,138,591 B2
(45) Date of Patent: Oct. 5, 2021

(54) SYSTEMS AND METHODS FOR GENERATING AND ADMINISTERING MOBILE APPLICATIONS USING PRE-LOADED TOKENS

(71) Applicant: The Toronto-Dominion Bank, Toronto (CA)

(72) Inventors: Hisham I. Salama, Charlotte, NC (US); Edward Lounsbury, Toronto (CA); Paul Mon-Wah Chan, Markham (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/682,467

(22) Filed: Nov. 13, 2019

(65) Prior Publication Data

US 2020/0082387 A1 Mar. 12, 2020

Related U.S. Application Data

(63) Continuation of application No. 14/869,818, filed on Sep. 29, 2015, now Pat. No. 10,510,071.

(Continued)

(51) Int. Cl.
*G06Q 20/32* (2012.01)
*G06Q 20/36* (2012.01)
*G06Q 20/38* (2012.01)

(52) U.S. Cl.
CPC ....... *G06Q 20/367* (2013.01); *G06Q 20/3226* (2013.01); *G06Q 20/3674* (2013.01); *G06Q 20/3829* (2013.01)

(58) Field of Classification Search
None
See application file for complete search history.

(56) References Cited

U.S. PATENT DOCUMENTS 6,173,272 B1   1/2001   Thomas
6,317,729 B1   11/2001  Camp
(Continued)

FOREIGN PATENT DOCUMENTS

CN   101635071   1/2010
JP   2013041427  2/2013

OTHER PUBLICATIONS

Mjølsnes et al., "On-Line E-Wallet System with Decentralized Credentials Keepers," Mobile Networks and Applications, vol. 8, 2003, pp. 87-89.

(Continued)

*Primary Examiner* — Joseph W. King
(74) *Attorney, Agent, or Firm* — Duane Morris LLP

(57) ABSTRACT

The disclosed embodiments include computerized methods and systems that provide mobile application programs to devices of users and that administer these mobile application programs using tokens "pre-loaded" with data. In one aspect, the disclosed embodiments may generate a mobile payment product, such as a mobile wallet, that is "pre-loaded" with eligible financial products. For example, the disclosed embodiments may receive a request from a user device to obtain an application program that administers the mobile wallet, and in response to the received request, may obtain information identifying one or more financial products eligible for inclusion in the mobile wallet. The disclosed embodiments may generate a mobile wallet token based on the eligible financial product information and store the mobile wallet token in cloud-based storage. The user device may, upon authenticating the user, obtain the mobile wallet token and provision the mobile wallet with the eligible financial products.

20 Claims, 5 Drawing Sheets

Related U.S. Application Data

(60) Provisional application No. 62/056,794, filed on Sep. 29, 2014.

(56) References Cited

U.S. PATENT DOCUMENTS

| | | | |
|---|---|---|---|
| 6,422,462 | B1 | 7/2002 | Cohen |
| 6,513,018 | B1 | 1/2003 | Culhane |
| 6,516,056 | B1 | 2/2003 | Justice |
| 6,748,367 | B1 | 6/2004 | Lee |
| 6,847,942 | B1 | 1/2005 | Land |
| 7,383,226 | B2 | 6/2008 | Kight |
| 7,664,699 | B1 | 2/2010 | Powell |
| 8,055,564 | B2 | 11/2011 | Wehunt |
| 8,065,190 | B2 | 11/2011 | Collas |
| 8,090,656 | B2 | 1/2012 | Solomon |
| 8,341,074 | B1 | 12/2012 | Reid |
| 8,355,982 | B2 | 1/2013 | Hazel |
| 8,401,968 | B1 | 3/2013 | Schattauer |
| 8,412,604 | B1 | 4/2013 | Graham |
| 8,601,557 | B2 | 12/2013 | Slaton et al. |
| 8,666,895 | B2 | 3/2014 | Grigg et al. |
| 9,152,974 | B1 | 10/2015 | Behm |
| 9,177,313 | B1 | 11/2015 | Silverman |
| 9,195,984 | B1 | 11/2015 | Spector |
| 9,210,167 | B1 | 12/2015 | Lafuente |
| 9,509,686 | B2 * | 11/2016 | Anantha ............... H04L 9/3234 |
| 2002/0029254 | A1 | 3/2002 | Davis et al. |
| 2002/0116331 | A1 | 8/2002 | Cataline |
| 2002/0161630 | A1 | 10/2002 | Kern |
| 2003/0028481 | A1 | 2/2003 | Flitcroft |
| 2003/0028483 | A1 | 2/2003 | Sanders |
| 2003/0182242 | A1 | 9/2003 | Scott |
| 2004/0026915 | A1 | 2/2004 | Thompson |
| 2004/0044616 | A1 | 3/2004 | Salter |
| 2004/0210449 | A1 | 10/2004 | Breck |
| 2005/0138388 | A1 | 6/2005 | Paganetti |
| 2005/0165684 | A1 | 7/2005 | Jensen |
| 2005/0268107 | A1 | 12/2005 | Harris |
| 2006/0237531 | A1 | 10/2006 | Heffez |
| 2006/0259358 | A1 | 11/2006 | Robinson |
| 2006/0288367 | A1 | 12/2006 | Swix |
| 2007/0106558 | A1 | 5/2007 | Mitchell |
| 2007/0114274 | A1 | 5/2007 | Gibbs |
| 2007/0198382 | A1 | 8/2007 | Ferrari |
| 2008/0004989 | A1 | 1/2008 | Yi |
| 2008/0040271 | A1 | 2/2008 | Hammad |
| 2008/0046366 | A1 | 2/2008 | Bemmel |
| 2008/0059352 | A1 | 3/2008 | Chandran |
| 2008/0091617 | A1 | 4/2008 | Hazel |
| 2008/0167980 | A1 | 7/2008 | Aaron et al. |
| 2008/0183619 | A1 | 7/2008 | Gould |
| 2008/0183819 | A1 | 7/2008 | Gould |
| 2008/0191007 | A1 | 8/2008 | Keay |
| 2008/0201769 | A1 | 8/2008 | Finn |
| 2008/0226136 | A1 | 9/2008 | Takaku |
| 2008/0283591 | A1 | 11/2008 | Oder, II |
| 2008/0320036 | A1 | 12/2008 | Winter |
| 2009/0006151 | A1 | 1/2009 | Zarghami |
| 2009/0006398 | A1 | 1/2009 | Lam |
| 2009/0024533 | A1 | 1/2009 | Fernandes |
| 2009/0164354 | A1 | 6/2009 | Ledbetter |
| 2009/0194584 | A1 | 8/2009 | Alexander |
| 2009/0265252 | A1 | 10/2009 | Fletcher |
| 2009/0292631 | A1 | 11/2009 | Wells |
| 2010/0036770 | A1 | 2/2010 | Fourez |
| 2010/0153451 | A1 | 6/2010 | Delia |
| 2010/0179451 | A1 | 7/2010 | Hately |
| 2010/0185545 | A1 | 7/2010 | Royyuru |
| 2010/0257612 | A1 | 10/2010 | McGuire |
| 2010/0312636 | A1 | 12/2010 | Coulter |
| 2011/0066493 | A1 | 3/2011 | Faith |
| 2011/0078073 | A1 | 3/2011 | Annappindi |
| 2011/0101093 | A1 | 5/2011 | Ehrensvard |
| 2011/0106698 | A1 | 5/2011 | Isaacson |
| 2011/0126002 | A1 | 5/2011 | Fu |
| 2011/0154467 | A1 | 6/2011 | Bomar |
| 2011/0178863 | A1 | 7/2011 | Daigle |
| 2012/0016731 | A1 | 1/2012 | Smith |
| 2012/0018511 | A1 | 1/2012 | Hammad |
| 2012/0030047 | A1 | 2/2012 | Fuentes |
| 2012/0030091 | A1 | 2/2012 | Hu |
| 2012/0041881 | A1 | 2/2012 | Basu |
| 2012/0054100 | A1 | 3/2012 | Pfohl |
| 2012/0084177 | A1 | 4/2012 | Tanaka |
| 2012/0013154 | A1 | 5/2012 | French |
| 2012/0143761 | A1 | 6/2012 | Doran |
| 2012/0150669 | A1 | 6/2012 | Langley |
| 2012/0173349 | A1 | 7/2012 | Buckley |
| 2012/0233005 | A1 | 9/2012 | White |
| 2012/0265631 | A1 | 10/2012 | Cronic |
| 2012/0271771 | A1 | 10/2012 | Bishop et al. |
| 2012/0290376 | A1 | 11/2012 | Dyers |
| 2012/0290449 | A1 | 11/2012 | Mullen |
| 2012/0303425 | A1 | 11/2012 | Katzin |
| 2012/0321078 | A1 | 12/2012 | Chambers |
| 2013/0006853 | A1 | 1/2013 | Amundsen |
| 2013/0013507 | A1 | 1/2013 | Browning |
| 2013/0030890 | A1 | 1/2013 | Richardson |
| 2013/0030915 | A1 | 1/2013 | Statler |
| 2013/0031006 | A1 | 1/2013 | McCullagh |
| 2013/0054330 | A1 | 2/2013 | O'Donnell |
| 2013/0060623 | A1 | 3/2013 | Walker |
| 2013/0060641 | A1 | 3/2013 | Al Gharabally |
| 2013/0110658 | A1 | 5/2013 | Lyman |
| 2013/0144707 | A1 | 6/2013 | Isaacson |
| 2013/0159178 | A1 | 6/2013 | Colon |
| 2013/0159186 | A1 | 6/2013 | Brudnicki |
| 2013/0173474 | A1 | 7/2013 | Ranganathan |
| 2013/0179952 | A1 | 7/2013 | O'Donnell |
| 2013/0198080 | A1 | 8/2013 | Anderson |
| 2013/0246258 | A1 | 9/2013 | Dessert |
| 2013/0246259 | A1 | 9/2013 | Dessert |
| 2013/0254052 | A1 | 9/2013 | Royyuru |
| 2013/0254102 | A1 | 9/2013 | Royyuru |
| 2013/0254115 | A1 | 9/2013 | Pasa et al. |
| 2013/0256403 | A1 | 10/2013 | MacKinnon |
| 2013/0282588 | A1 | 10/2013 | Hruska |
| 2013/0290087 | A1 | 10/2013 | Merwarth |
| 2013/0304642 | A1 | 11/2013 | Campos |
| 2013/0334308 | A1 | 12/2013 | Priebatsch |
| 2014/0040052 | A1 | 2/2014 | Arthur et al. |
| 2014/0058834 | A1 | 2/2014 | Liberty |
| 2014/0074655 | A1 | 3/2014 | Fei et al. |
| 2014/0156508 | A1 | 6/2014 | Argue |
| 2014/0194197 | A1 | 7/2014 | Graziosi |
| 2014/0258135 | A1 | 9/2014 | Park |
| 2014/0279504 | A1 | 9/2014 | Cook |
| 2014/0379576 | A1 | 12/2014 | Marx |
| 2015/0032627 | A1 | 1/2015 | Dill |
| 2015/0095240 | A1 | 4/2015 | Specogna |
| 2015/0254650 | A1 | 9/2015 | Bondesen |
| 2015/0254656 | A1 | 9/2015 | Bondesen |
| 2015/0302384 | A1 | 10/2015 | Aadi |
| 2016/0026999 | A1 | 1/2016 | Kurian |

OTHER PUBLICATIONS

De et al., "Towards an Interoperable Mobile Wallet Service," 10th International Conference and Expo on Emerging Technologies for a Smarter World (CEWIT). 2013 (6 pages).

Tokenisation, Secure Credit Card Payment, Wirecard (2014) https://www.wirecard.com/fileadmin/user_upload/wirecard/downloads/en/documents/Tokenisation_Factsheet-ENG_Web.pdf.

* cited by examiner

SYSTEMS AND METHODS FOR GENERATING AND ADMINISTERING MOBILE APPLICATIONS USING PRE-LOADED TOKENS

CROSS-REFERENCE TO RELATED APPLICATION

This application claims the benefit of priority to U.S. application Ser. No. 14/869,818, filed Sep. 29, 2015, which claims the benefit of priority to U.S. Provisional Application No. 62/056,794, filed Sep. 29, 2014. The disclosures of each of these applications are expressly incorporated by reference herein to their entireties.

BACKGROUND

Technical Field

The disclosed embodiments generally relate to computerized systems and methods for administering mobile application programs, and more particularly, and without limitation, to computerized systems and methods for administering mobile application programs using pre-loaded tokens.

BACKGROUND INFORMATION

Today, mobile payment products, such as mobile wallet applications executed by mobile devices, enable users to purchases goods and services at various retailers. While eliminating the need to carry a physical wallet including cash and other payment instruments, such as credit cards and debit cards, the multiple authentication and configuration steps required of typical mobile wallet applications may discourage many users from adopting mobile wallet technologies. For example, in order to establish a mobile wallet on a mobile device, a user may be required to download the mobile wallet application from a financial institution, register for mobile wallet services provided by the financial institution, and only after a successful registration, identify and manually load information identifying each of the user's credit cards, debit cards, and rewards and loyalty cards into the mobile wallet application. The multiple registration and configuration steps characteristic of today's mobile wallet technologies may discourage many users from adopting mobile wallets for their daily purchases, despite their convenience.

SUMMARY

The disclosed embodiments include computer-implemented systems and methods that generate a token that is "pre-loaded" with data to administer one or more mobile application programs.

In some embodiments, an apparatus includes at least one processor and a memory storing executable instructions that, when executed by the at least one processor, cause the at least one processor to perform the step of receiving, from a device of a user, a request to obtain an application program executable by the user device. In response to the received request, the executed instructions further cause the at least one processor to perform the step of obtaining information identifying one or more financial products eligible for inclusion in a mobile wallet administered by the application program. In one aspect, the eligible financial products may be held by the user. The executed instructions further cause the at least one processor to perform the step of generating a mobile wallet token based on the eligible financial product information, and performing operations that store the generated mobile wallet token in a data repository. In some aspects, the data repository may be accessible to the user device over a network.

The disclosed embodiments also include a computer-implemented method includes receiving, using at least one processor, and from a device of a user, a request to obtain an application program executable by the user device. In response to the received request, the method obtains, using at least one processor, information identifying one or more financial products eligible for inclusion in a mobile wallet administered by the application program. In some aspects, the eligible financial products may held by the user. The method also includes generating, using the at least one processor, a mobile wallet token based on the eligible financial product information, and using the at least one processor, performing operations that store the generated mobile wallet token in a data repository. In some aspects, the data repository may be accessible to the user device over a network.

In addition, the disclosed embodiments include a tangible, non-transitory computer-readable medium storing instructions that, when executed by at least one processor, cause the at least one processor to perform a method. The method includes receiving from a device of a user, a request to obtain an application program executable by the user device, and obtaining, in response to the received request, information identifying one or more financial products being eligible for inclusion in a mobile wallet administered by the application program. In some aspects, the eligible financial products may be held by the user. The method also generates a mobile wallet token based on the eligible financial product information, and performs operations that store the generated mobile wallet token in a data repository. In some aspects, the data repository may be accessible to the user device over a network.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims.

DESCRIPTION OF THE EMBODIMENTS

Figure 1:
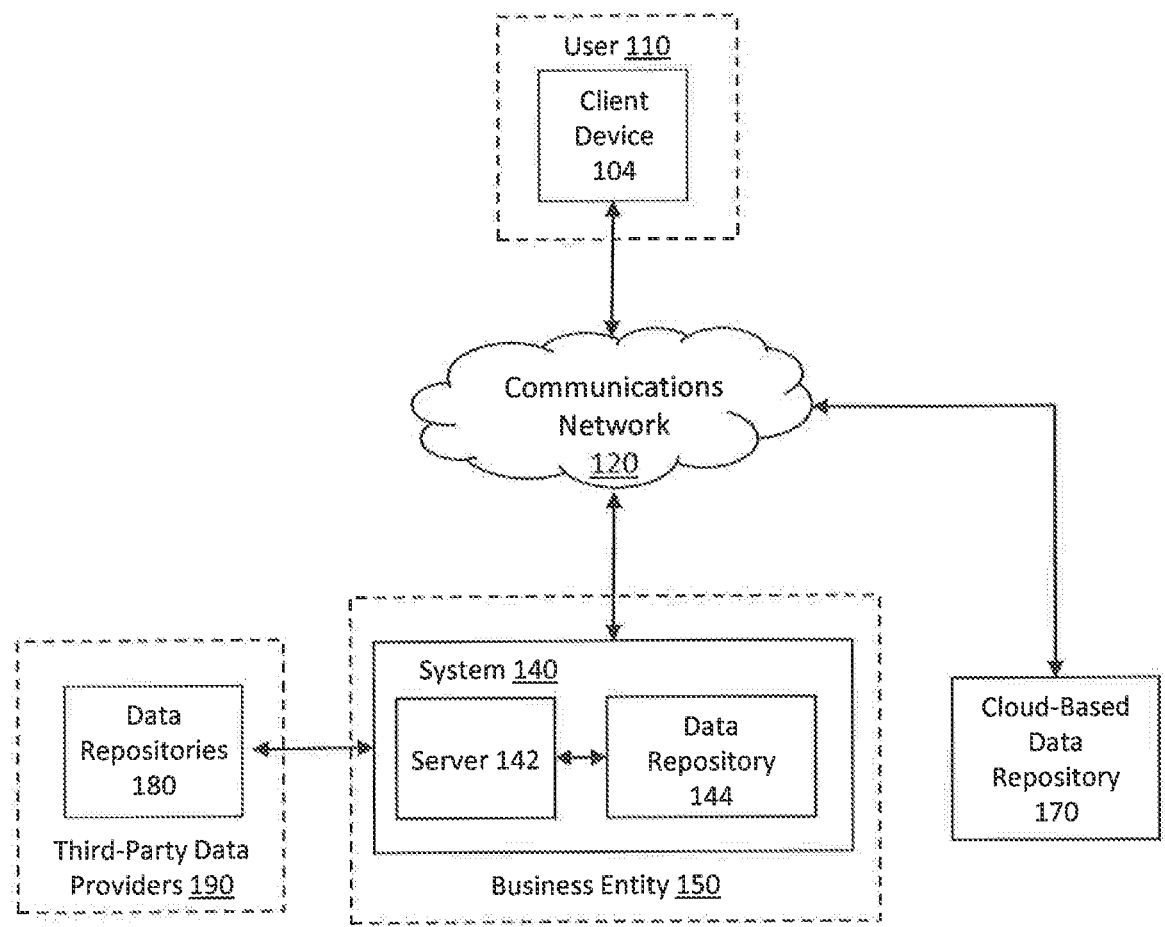
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

FIG. 1 illustrates an exemplary computing environment 100 consistent with certain disclosed embodiments. In one aspect, computing environment 100 may include client device 104, system 140, cloud-based data repository 170, and data repositories 180, and a communications network 120 connecting one or more of the components of environment 100.

In one embodiment, client device 104 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, client device 104 may be associated with one or more users, such as user 110. For instance, user 110 may operate client device 104 and may do so to cause client device 104 to perform one or more operations consistent with the disclosed embodiments. In some aspects, client device 104 may include a smart card, chip card, integrated circuit card (ICC), and/or other card having an embedded integrated circuit. By way of example, systems consistent with the disclosed embodiments (e.g., system 140) may be configured to track one or more secured locations accessed by user 110 (e.g., a street entrance to a secured apartment building) using a smart card incorporated into client device 104.

Client device 104 may include known computing device components. For instance, client device 104 may include one or more tangible, non-transitory memories that store data and/or software instructions, and one or more processors configured to execute software instructions. Client device 104 may include one or more display devices that display information to a user and one or more input device(s) to allow the user to input information to client device 104 (e.g., keypad, keyboard, touch screen, voice activated control technologies, or any other type of known input device).

In one aspect, client device 104 may store in memory one or more software applications that run on client device 104 and are executed by the one or more processors. For instance, client device 104 may store software applications that, when executed by one or more processors, perform operations that allow user 110 (through client device 104) to interact with business entity 150 through, for example, a computing device, such as server 142 or other computing component(s) of system 140. In certain aspects, additional software applications may, when executed by client device 104, cause client device 104 to send information to be stored in a memory remote to client device 104 and/or receive information stored in a memory remote to client device 104 (e.g., memory associated with server 142, such as data repository 144). The disclosed embodiments are, however, not limited to such exemplary configurations, and in further embodiments, client device 104 may be configured in any additional or alternate manner to enable communication and data exchange with system 140 across network 120.

Business entity 150 may, for example, be any type of business entity that may provide financial account(s) to one or more users (e.g., customers of business entity 150). For example, business entity 150 may be a financial institution, such as a commercial bank, an investment bank, a provider of a payment instrument or financial service accounts, etc. In some embodiments, a financial service account may be a checking, savings, credit, debit, prepay, and/or a reward or loyalty account, and a payment instrument may include, but is not limited to, a personal or corporate credit card, a debit card, a prepaid credit or debit card, or a check instrument.

System 140 may be a computing system configured to execute software instructions to perform one or more operations consistent with disclosed embodiments. In one aspect, system 140 may be associated with business entity 150, e.g., a financial institution. System 140 may be a distributed system that may include computing components distributed across one or more networks, such as network 120, or other networks.

In one aspect, system 140 may include computing components known to those skilled in the art and configured to store, maintain, and generate data and software instructions. For example, system 140 may include one or more servers (e.g., server 142) and tangible, non-transitory memory devices (e.g., data repository 144). Server 142 may include one or more computing devices (e.g., servers) that may be configured to execute software instructions to perform one or more processes consistent with the disclosed embodiments. In one example, server 142 may be a computing device that executes software instructions that perform operations that provides information to one or more other components of computing environment 100. In one embodiment, server 142 may include a general purpose computer (e.g., a personal computer, network computer, server, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as an digital banking portal, and services consistent with disclosed embodiments. For instance, server 142 may be configured to provide information associated with a requested web page over communications network 120 to client device 104, which may render the received information and present content from the web page on a display device. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150. In certain aspects, data repository 144 may be configured to store data identifying one or more customers of business entity 150 (e.g., customer profile data), financial account data associated with the customers (e.g., account data), data identifying transactions involving one or more customers of business entity 150 (e.g., transaction data), data derived from governmental or approved forms of authenticating identification (e.g., KYC credential data). Data repository 144 may also be configured to store one or more mobile wallet applications (e.g., mobile "apps") that, as described below, may be provided in response to requests from client device 104.

Cloud-based data repository 170 may include one or more physical data storage units (e.g., tangible non-transitory computer-readable media) disposed across multiple computing systems and servers. In some aspects, system 140, and additionally or alternatively, client device 104, may be configured to access cloud-based data repository 170 through a corresponding API across network 120 using any of the communications protocols outlined above.

In certain embodiments, cloud-based data repository 170 may be configured to store one or more pre-loaded, encrypted mobile wallet tokens and corresponding private key values. By way of example, and as described below, the pre-loaded, encrypted mobile wallet tokens may be generated by system 140 using the exemplary processes described below, and may be delivered to client device 104. In other aspects, cloud-based data repository 170 may be configured to store information relating to business entity 150, which includes, but is not limited to, customer profile data, account data, transaction data, and KYC data.

Data repositories 180 may include one or more data storages (e.g., tangible non-transitory computer-readable media) that store information associated with one or more third-party data providers 190. In some aspects, system 140 may be configured to request and obtain stored information through a corresponding application programming interface (API) using any of the communications protocols outlined above. In some aspects, third-party data providers 190 may include, but are not limited to, local state, and Federal government entities, airlines, rail carriers, electronic retailers, credit reporting agencies, issuers of credit cards, issuers of rewards or loyalty cards, and any additional or alternate provider of data relevant to user 110. In some instances, data repository 190 may store data that includes, but is not limited to, information identifying government-issued identifiers of user 110 (e.g., a driver's license, passport data, visa information), information identifying one or more financial products held by user 110, information identifying financial services transactions initiated by user 110, credit report data associated with user 110, information identifying travel documents of user 110, and/or information identifying credit cards, debit cards, prepaid credit or debit cards, and loyalty or reward cards held by user 110 and/or of potential interest to user 110.

Although computing environment 100 is illustrated in FIG. 1 with client device 104 in communication with system 140, data repositories 180, and could-based data repository 170, persons of ordinary skill in the art will recognize that environment 100 may include any number of number of mobile or stationary client devices 104, and any additional number of computers, systems, or servers without departing from the spirit or scope of the disclosed embodiments. Further, although computing environment 100 is illustrated in FIG. 1 with a single business entity 150 and/or system 140, and a single could-based data repository 170, persons of ordinary skill in the art will recognize that environment 100 may include any number of additional number of business entities and corresponding systems, any additional number of additional data repositories, any number of additional servers and data repositories, and any additional number of computers, systems, servers, or server farms without departing from the spirit or scope of the disclosed embodiments.

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

The disclosed embodiments include systems and methods that generate a mobile payment product, such as a mobile wallet, that is "pre-loaded" with one or more financial products available to a user (e.g., user 110) and eligible for inclusion within the mobile wallet. In some aspects, a computing system associated with a financial institution (e.g., system 140) may encapsulate information identifying the one or more available and eligible financial products into a corresponding data package (e.g., a "mobile wallet token"), which may be linked to user 110 and/or client device 102, encrypted, and stored in a data repository accessible to system 140 (e.g., cloud-based data repository 170).

In some embodiments, system 140 may be configured to identify the available and eligible financial products based on profile data associated with user 110 (e.g., customer profile data stored in data repository 144), data associated with financial service transactions initiated by user 110 (e.g., transaction data stored in data repository 144), and/or data identifying one or more accounts held by user 110 at the financial institution (e.g., account data stored in data repository 144. In other embodiments, system 140 may be configured to obtain the customer profile, transaction, and/or account data from one or more third-party data providers (e.g., from data repositories 180 of third-party data providers 190). In some aspects, the third-party data providers may be associated with an entity of a local, state, or Federal government, and additionally or alternatively, other business entities, such as those that issue financial products or provide credit reporting services.

In certain aspects, system 140 may also be configured to provide client device 104 with an application program (e.g., a mobile "app") that, upon execution by client device 104, establishes the mobile wallet on client device 104. Client device 104 may, during execution of the application program, present an interface to user 110 that enables user 110 to log into the application program by entering one or more authentication credentials into client device 104. In some embodiments, and in response to a successful authentication of user 110, system 140 may be configured to retrieve the mobile wallet token from cloud-based data repository 170 and transmit the retrieved mobile wallet token to client device 104. Client device 104 may, for example, process the received mobile wallet token to populate the mobile wallet with the one or more identified financial products, which may facilitate purchases of goods or services from one or more participating physical or electronic retailers.

Further, in other aspects, system 140 may be configured to monitor the stored customer profile, transaction, and/or account data to identify additional financial products available to user 110 and eligible for include in user 110's mobile wallet. By way of example, user 110 may process user 110's transaction data to determine (e.g., based on a bank identification number (BIN)) that user 110 purchased goods and services using a new Visa™ credit card not previously included within user 110's mobile wallet token. In some aspects, system 140 may execute software processes that store information identifying the new Visa™ credit card (e.g., that "flag" the new credit card). Upon detection of a subsequent login to the mobile wallet application by user 110, system 140 may execute software processes that encapsulate the stored information to form an updated mobile wallet token, which may be transmitted to client device 104.

Using the disclosed embodiments, system 140 may generate a mobile wallet token that, upon receipt and processing by client device 104, populates user 110's mobile wallet with one or more pre-loaded financial products. In some aspects, the automatic pre-loading of user 110's mobile wallet by system 140 may reduce a burden imposed on user 110 to identify and manually populate the mobile wallet with eligible financial products. Further, the population of the mobile wallet by system 140 may provide user 110 with an enhanced and more complete view of the available financial products that are eligible for use within the mobile wallet.

Figure 2:
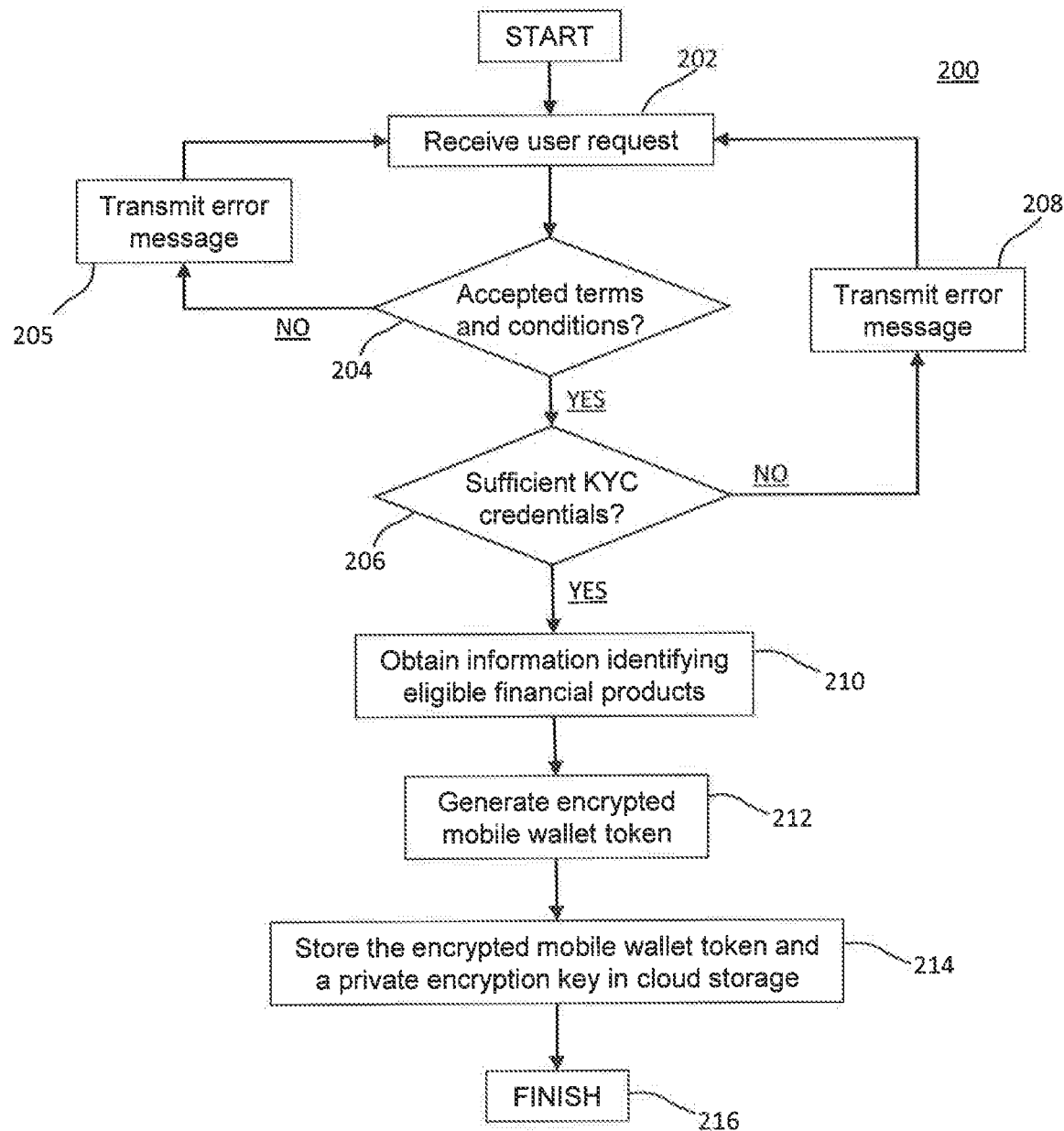
FIG. 2 is a flowchart of an exemplary process for loading a mobile wallet with eligible financial products, consistent with disclosed embodiments.

FIG. 2 illustrates an exemplary process 200 for loading a mobile wallet with eligible financial products available to a new or existing customer of a financial institution, in accordance with disclosed embodiments. In one embodiment, a system associated with the financial institution (e.g., system 140 associated with business entity 150) may be configured to receive a request from the new or existing customer (e.g., user 110) to register or enroll in a mobile wallet service provided by the financial institution. In response to the received request, system 140 may be configured to execute software instructions that identify one or more financial products associated with user 110 and eligible for inclusion in the requested mobile wallet, and to encapsulate information associated with the eligible financial products into a mobile wallet token for delivery to a device associated with user 110 (e.g., client device 104). In certain aspects, the disclosed embodiments may be configured to provide the mobile wallet token to client device 104 in response to an initial or subsequent attempt by user 110 to login to a mobile wallet application executing on client device 104, thus automatically populating the requested mobile wallet with the eligible financial products without input from user 110.

For example, user 110 may, via client device 104, access a web page associated with the financial institution that may be presented by client device 104. In one aspect, user 110 may be an existing customer of the financial institution, and may enter one or more authentication credentials (e.g., a user name, a password, an account number, and a personal identification number) into the accessed web page. In other aspects, user 110 may represent a new customer of the financial institution, and upon accessing the web page, user 110 may, via client device, register for digital banking with the financial institution, and may obtain authentication credentials that enable user 110 to access one or more digital banking services provided by the financial institution.

In certain embodiments, client device 104 may transmit the authentication credentials to system 140 over network 120, and system 140 may determine whether to grant user 110 access to one or more of the financial institution's digital banking services. By way of example, system 140 may compare the received authentication credentials against stored authentication credentials associated with one or more registered customers (e.g., as stored within data repository 144) to determine whether to grant user 110 access to the financial institution's web page (or other digital portal) and digital financial services.

In response to a successful authentication, system 140 may initiate an authenticated communications session with client device 104 and provide client device 104 with information identifying one or more digital banking services available to user 110, which client device 104 may process and render for presentation to user 110 within a corresponding web page or graphical user interface (GUI). By way of example, user 110 may, through client device 104, view a portion of the web page that describes a mobile wallet service provided by the financial institution (e.g., an advertisement for the mobile wallet service), and user 110 may click, tap, or otherwise select a region within the displayed web page to request access to the mobile wallet service. Client device 104 may, in response to user 110's selection, generate a request to enroll in and access the mobile wallet service, which may be transmitted to system 140 across network 120.

The disclosed embodiments are, however, not limited to authenticated communications sessions initiated by user 110 through a web page or graphical user interface (GUI) associated with the financial institution and presented by client device 104. In other instances, user 110 may access an instant messaging application (e.g., WhatApp™) executed by client device 104, which may enable user 110 to transmit an instant message to one or more representatives of the financial institution requesting access to the mobile wallet service. Further, user 110 may, in some instances, access a social networking application (e.g., Facebook™ or LinkedIn™) or microblogging application (e.g., Twitter™) through client device 104, and request access to the mobile wallet application through one or more messaging protocols appropriate to the social networking or microblogging application (e.g., by posting to a timeline associated with the financial institution, by attaching an appropriate hashtag or identifier to the posting, and/or through a messaging service native to the social networking application). In additional aspects, client device 104 may enable user 110 to request access to the mobile wallet service via text message (e.g., SMS text message), email message, or other form of electronic communication transmitted from client device 104 to system 140 across network 120.

Furthermore, the disclosed embodiments are not limited to requests for mobile wallet access generated by user 110 through self-service tools executed by client device 104 (e.g., web pages, GUIs, mobile applications, etc.). In some aspects, user 110 may visit a local branch of the financial institution, and may request access to the mobile wallet service from a representative of the financial institution at the local branch. In some instances, the representative may enter information identifying user 110 into an interface at a computing device or terminal disposed at the local branch, and a web tool or other application executed by the computing device or terminal may process the information to generate a request for the mobile wallet service, which may be transmitted to system 140 across network 120.

In other aspects, user 110 may request the mobile wallet service by contacting by a telephone call center associated with the financial institution. For example, user 110 may provide authenticating information (e.g., name, address, government-issued identifiers, etc.) to a representative of the financial institution at the call center, who may enter the information into an interface at a computing device or terminal disposed at the call center. In certain instances, a web tool or other application executed by the computing device or terminal may process the entered information to generate a request for the mobile wallet service, which may be transmitted to system 140 across network 120.

Referring to FIG. 2, system 140 may receive the request to enroll in or register for a mobile wallet service provided by the financial institution (e.g., In step 202). By way of example, system 140 may receive the request from client device 104 and additionally or alternatively, from a computing device or terminal disposed at a local branch or call center associated with the financial institution. The received request may, in some instances, include information identifying user 110, client device 104, and/or the computing device or terminal.

In response to the received request, system 140 may confirm user 110's acceptance of one or more terms and conditions of the mobile wallet service (e.g., in step 204). In some aspects, system 140 may tailor the terms and conditions of the mobile wallet service to a status of user 110 at the financial institution, e.g., system 140 may present terms and conditions to a new customer that differ from the terms and conditions presented to an existing customer.

By way of example, system 140 may generate and transmit information identifying one or more terms and conditions of the mobile wallet service to client device 104 for presentation to user 110. In an embodiment, client device 104 may receive the information, and in some instances, may present the terms and conditions to user 110 within the web page or GUI, and further, may prompt user 110 to input a response into client device 104 indicative an acceptance of the terms and conditions. Client device 104 may process and transmit, to system 140, user 110's response to the presented terms and conditions to server 140.

In other aspects, system 140 may transmit the information identifying the terms and conditions to the computing device or terminal disposed at the local branch or call center of the financial institution for presentation to user 110. In some instances, the computing device or terminal may present the terms and conditions to user 110 through a corresponding GUI (or audibly present the terms and conditions to user 110), and as described above, may prompt user 110 to provide a response to the computing device or terminal that indicates an acceptance of the terms and conditions. Additionally or alternatively, the representative of the financial institution (e.g., at the local branch or call center) may present the terms and conditions to user 110 and may provide the corresponding response to the computing device or terminal. In certain aspects, the computing device or terminal disposed at the local branch or call center may process and transmit user 110's response to the presented terms and conditions to server 140.

In step 204, system 140 may determine whether user 110 accepts the terms and conditions of the mobile wallet service. If system 140 finds that user 110 did not accept the terms and conditions of the mobile wallet service (e.g., step 204; NO), system 140 may be configured to generate an error message indicative of user 110's failure to accept the terms and conditions, which system 140 may transmit to client device 104 for presentation to user 110 (e.g., in step 205). Process 200 may then pass back to step 202, and in some aspects, system 140 may be configured to await receipt of additional requests to access the financial institution's mobile wallet service.

If, however, system 140 finds that user 110 accepted the terms and conditions of the mobile wallet service (e.g., step 204; YES), system 140 may determine whether sufficient documentation (e.g., know-your-client (KYC) credentials) exists to verify user 110's identity for enrollment in the mobile wallet service (e.g., in step 206). By way of example, KYC credentials consistent with the disclosed embodiments may include, but are not limited to, government-issued forms of identification (e.g., a driver's license, a passport, a social security card, an immigration status card, etc.), a birth certificate, a statement from a utility (e.g., an electric or water bill), documents issued by a state or Federal court, a legal document (e.g., a lease, title, or deed), and/or statements of account issued by one or more financial institutions.

In certain aspects, the financial institution associated with system 140 may establish a predetermined number and/or type of KYC credentials that are "sufficient" to verify user 110's identity, and the number and/or type of sufficient KYC credentials may be tailored to a status of user 110 at the financial institution. For example, system 140 may be configured to verify an identify of a new customer of the financial institution based on three different forms of KYC credentials, while an existing customer's identify may be verified based on a single government-issued form of identification. In some instances, system 140 may be configured to generate and store information identifying the predetermined number and/or type of KYC credentials that are sufficient to verify user 110's identity within a corresponding data repository (e.g., data repository 144).

In some embodiments, system 140 may be configured to obtain the information identifying the predetermined number and/or type of KYC credentials that are sufficient to verify user 110's identify, and in step 206, may determine whether user 110 is associated with the predetermined number and type of KYC credentials. By way of example, system 140 may be configured to access information (e.g., within data repository 140) that identifies one or more KYC credentials presented by user 110 in a prior authentication process at the financial institution. In other instances, the accessed information may specify that user 110 successfully obtained one or more financial services or products offered by the financial institution (and/or other financial institutions) that require KYC credentials similar to those sufficient for enrollment in the mobile wallet service. In certain aspects, system may be configured to compare the accessed information against the predetermined number and/or type of KYC credentials to verify user 110's identity in step 206.

In other embodiments, in step 206, system 140 may be configured to generate and transmit, to the computing device or terminal at the local branch or call center, a message requesting the representative of the financial institution to verify that user 110 possesses the predetermined number and/or type of KYC credentials deemed sufficient to verify user 110's identify for enrollment in the mobile wallet service. In some aspects, the financial institution representative may verify user 110's possession of the predetermined number and/or type of KYC credentials, and may provide input indicative of the verification (e.g., user 110 does or does not possess the specified KYC credentials) into the computing device or terminal, which may transmit the input to system 140 as a response to the message. System 140 may, for example, verify user 110's identity in step 206 based on the received response.

If system 140 fails to verify user 110's identity based on an insufficient number and/or type of previously or currently presented KYC credentials (e.g., step 206; NO), system 140 may be configured to generate an error message indicative of the failed verification, which system 140 may transmit to client device 104 for presentation to user 110 (e.g., in step 208). In some aspects, the error message may identify the predetermined type and/or number of KYC credentials that the financial institution deems sufficient to verify user 110's identity for the mobile wallet service, and additionally or alternatively, may identify those one or more types of KYC credentials that would enable system 140 to verify user 110's identity. Process 200 may then pass back to step 202, and in some aspects, system 140 may be configured to await receipt of additional requests to access the financial Institution's mobile wallet service.

If, however, system 140 were to verify user 110's identify based on user 110's submission of the specified number and/or type of KYC credentials (e.g., step 206; YES), system 140 may execute software instructions that obtain information identifying one or more financial products eligible for inclusion into a mobile wallet (e.g., in step 210). In some embodiments, even if user 110 previously authenticated his or her identity with system 140, system 140 may require additional authentication steps prior to obtaining the eligible financial product information in step 210.

By way of example, an eligible financial product may be held by or associated with user 110, and may include, but is not limited to, a credit card, a debit card, a pre-paid credit or debit card, a reward and/or loyalty card, and additional or alternate financial instrument or payment product with which user 110 may initiate a financial services transaction involving a business entity (e.g., a physical or electronic retailer). In certain aspects, at least one of the eligible financial products may be issued by the financial institution associated with system 140. In other aspects, at least one of the eligible financial products may be issued by a business entity separate from the financial institution, e.g., an additional financial institution and/or a retailer.

Further, as described below in reference to FIG. 3, system 140 may be configured to obtain the eligible financial product information from customer account, profile, and transaction data obtained one or more data repositories local accessible to system 140, and additionally or alternatively, obtained from one or more data repositories 180 associated with third-party data providers 190 and accessible to system 140 over network 120. In other aspects, described below in reference to FIG. 3, system 140 may also be configured to supplement the information obtained for a particular financial product (e.g., a credit card issued by a financial institution different from financial institution 150) with additional data obtained from one or more of third-party data providers 190 (e.g., a governmental database, a credit reporting agency, and/or an issuer of the financial product).

Figure 3:
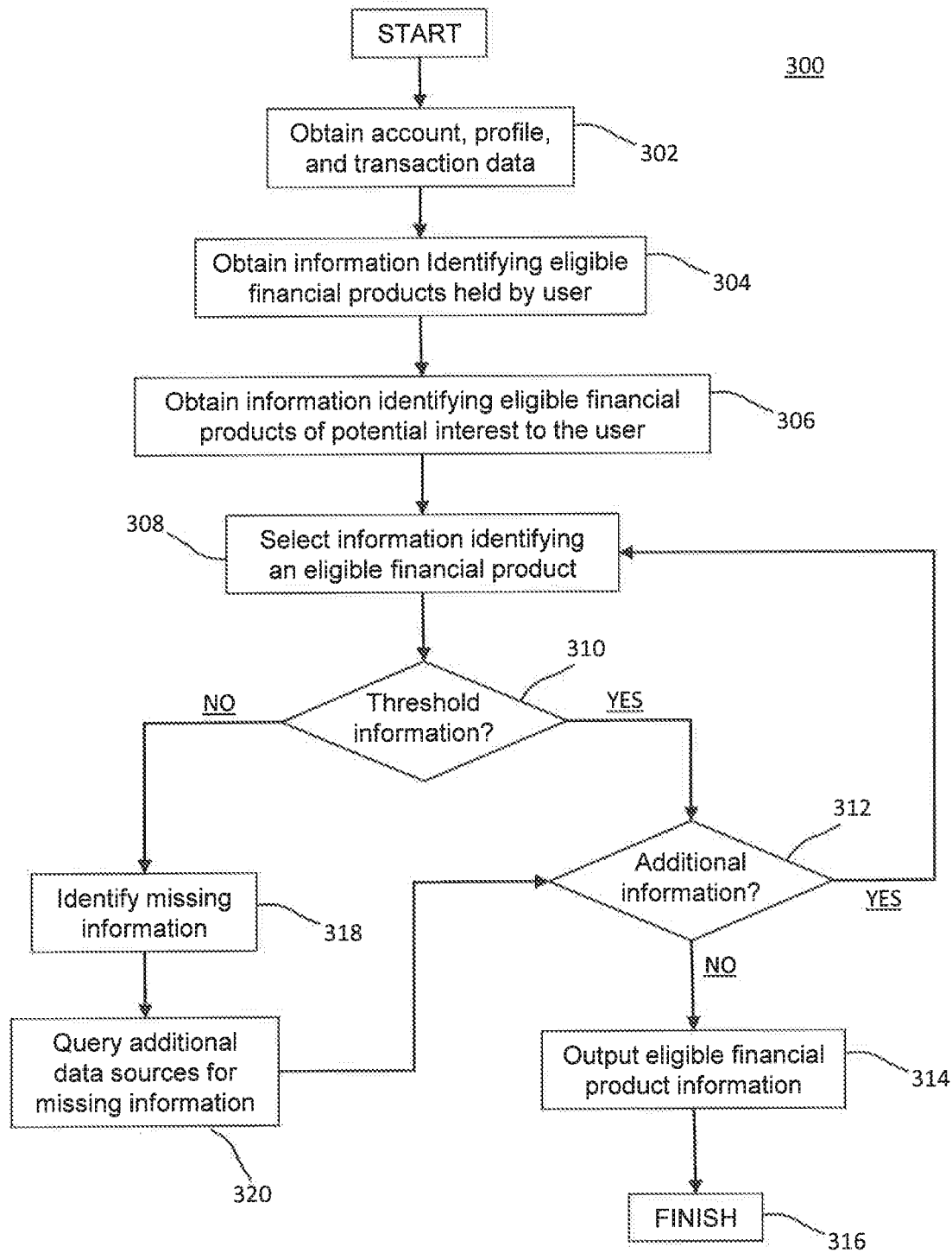
FIG. 3 is a flowchart of an exemplary process for identifying financial products eligible for inclusion in a mobile wallet, consistent with disclosed embodiments.

FIG. 3 illustrates an exemplary process 300 for identifying financial products eligible for inclusion in a mobile wallet, in accordance with disclosed embodiments. In one embodiment, a system associated with the financial institution (e.g., system 140 associated with business entity 150) may be configured to obtain account, profile, and/or transaction data associated with a customer requesting access to a mobile wallet service (e.g., user 110). System 140 may, in some aspects, execute software instructions to process the obtained data and extract information associated with one or more eligible financial products held by user 110, and additionally or alternatively, one or more eligible financial products that may be of potential interest to user 110. By way of example, an eligible financial product may include, but is not limited to, a credit card, a debit card, a pre-paid credit or debit card, a reward and/or loyalty card, and additional or alternate financial instrument or payment product with which user 110 may initiate a financial services transaction involving a business entity (e.g., a physical or electronic retailer). Further, in some aspects, system 140 may be configured to supplement the extracted financial product information with data obtained from systems associated with one or more third-party data providers, such as governmental entities, credit reporting agencies, and/or business entities that issue the financial products (e.g., data repositories 180 associated with third-party data providers 190).

In FIG. 3, system 140 may execute software instructions that obtain account data, profile data, and/or transaction data associated with user 110 (e.g., in step 302). By way of example, system 140 may be configured to obtain one or more of the account data, user profile data, and transaction data from a locally accessible data repository (e.g., account data, user profile data, and/or transaction data stored within data repository 144 and/or cloud-based data repository 170). Further, and as outlined above, the obtained account data may include one or more data records identifying financial products and/or financial service accounts issued by the financial institution and held by customers of the financial institution. In some instances, the customer profile data may include information (e.g., full names, mailing and/or billing addresses, government-issued identifiers (e.g., social security numbers, driver's license numbers, etc.), and/or account numbers) provided by customers during registration for digital baking services provided by the financial institution.

The obtained transaction data may, for example, include one or more data records identifying financial services transactions involving financial products held by user 110 and/or financial services accounts held by user 110. For example, the transaction data records may identify purchases of goods or services from electronic or physical retailers initiated by user 110 and involving a financial product held by user 110 (e.g., a credit card, a debit card, etc.). In some aspects, the transaction data records for purchase transactions may include information identifying the financial product (e.g., account numbers, expiration dates, bank identification numbers (BINs) of an issuing financial institution, and/or card security codes), as well as information identifying a corresponding card holder (e.g., a card holder name, a billing address, and/or a shipping address used to deliver purchased goods).

In other instances, the transaction data records may identify corresponding financial services transactions (e.g., electronic funds transfer (EFT) transactions) between financial services accounts of user 110. For example, the transaction data records may identify payments executed and/or scheduled by user 110 between a source account held by user 110 at the financial instruction (e.g., a checking or savings account) and one or more destination accounts associated with a third party (e.g., account linked to a credit card issued by another financial institution, an account linked to a gym membership, an account linked to a financial institution servicing a mortgage, etc.). The data records may include, for the initiated or scheduled transactions, information identifying the source account, information identifying the destination account, a BIN identifying a financial institution associated with the destination account.

In certain aspects, the initiated or scheduled transactions may include a "push" transaction in which user 110, via client device 104, configures system 140 to perform an EFT transaction from a checking of savings account held at the financial institution to a corresponding destination account associated with a third party (e.g., a credit card issuer, etc.). For example, user 110 may, through a web page or other digital portal of the financial institution displayed by client device 104, request that system 140 initiate and execute a transfer of funds between a source checking account at the financial institution and a destination account of a credit card issuer (e.g., in satisfaction of an outstanding credit card bill). In some aspects, the transaction data records may identify transaction details (e.g., date, time, amount) and information identifying the source and destination accounts (e.g., account numbers, BINs identifying the source and destination financial institutions, bank routing numbers, card expiration dates, card security codes, and information identifying the source and destination account holders).

In other aspects, the initiated or scheduled transactions may include a "pull" transaction in which user 110, via client device 104, configures a system associated with a third party to electronically transfer funds from a financial services account held by user 110 at the financial institution (e.g., a checking or savings account) to a destination account at a specified day and time. By way of example, user 110 may, via client device 104, access a web page or other digital portal provided by a system of a credit card issuer, and may initiate a transaction that transfers specified funds from user 110's checking account in satisfaction of an outstanding credit card bill. In some instances, the data record associated with a "pull" transaction may identify the source financial services account (e.g., user 110's checking account) and transaction details (e.g., date, time, and amount), but may include limited information associated with the destination account (e.g., a portion of the destination account number and/or a BIN of the credit card issuer).

Referring back to FIG. 3, in step 304, system 140 may execute software instructions that process the obtained account data, user profile data, and/or transaction data to identifying one or more eligible financial products held by user 110 (e.g., a financial product held in user 110's name). For example, system 140 may be configured to compare an identifier of user 110 (e.g., an identification number, user name, etc.) against data records of the obtained account and user profile data to identify at least one of the eligible financial accounts held by user 110. Further, in some aspects, system 140 may also be configured in step 304 to obtain account data associated with the identified financial products (e.g., a bank identification number (BIN) of the financial institution, an account number, an expiration date, and/or a card security code), and additionally or alternatively, data linking user 110 and the identified financial product (e.g., a billing address associated with the identified financial product).

Further, in step 304, system 140 may process the obtained transaction data records to identify at least one of the eligible financial products held by user 110. In some aspects, system 140 may execute software instructions that parse the transaction data records to identify purchase transactions involving accounts linked to a BIN of the financial institution. System 140 may, in some embodiments, determine that the accounts linked to the BIN of the financial institution corresponding to eligible financial products, and system 140 may be configured to extract information identifying the eligible financial products from the transaction data records. By way of example, user 110 may request a mobile wallet provided by TD Bank™, and system 140 may parse the obtained transaction records to identify purchase transactions involving accounts linked to a BIN of TD Bank™. System 140 may, in some instances, determine that credit and/or debit cards issued by TD Bank™ and linked to the identified accounts are eligible for inclusion in user 110's mobile wallet, and system 140 may extract information from the transaction data records that identifies the credit and/or debit cards and facilitates the loading of the credit and/or debit cards into user 110's mobile wallet.

In other embodiments, in step 304, system 140 may identify one or more candidate financial products issued by third parties (e.g., credit cards issued by other financial institutions), and may process the transaction data records to identify transactions having BINs corresponding to the candidate financial products. When system 140 identifies a BIN corresponding to one of the candidate financial products within the transaction data records, system 140 may determine that the user 110 holds the corresponding candidate financial product, which may be eligible for inclusion in user 110's mobile wallet. In some aspects, system 140 may extract information from the transaction data records that identifies and facilitates the loading of the corresponding candidate financial product into user 110's mobile wallet.

By way of example, user 110 may request a mobile wallet provided by TD Bank™, and system 140 may identify, as candidate financial products, credit and debit cards issued by Wells Fargo™, credit cards issued by American Express™, and credit cards issued by Discover™. As described above, system 140 may be configured to search the obtained transaction data records for BINs corresponding to the Wells Fargo™, American Express™, and Discover™ cards, and by way of example, system 140 may identify a "pull" transaction in which systems associated with American Express™ transferred funds from user 110's checking account at TD Bank™ (e.g., to pay an outstanding bill). In some aspects, system 140 may determine that user 110 hold an American Express™ credit card linked to the account within the obtained transaction data records, and system 140 may extract information from the transaction data records that identifies and facilitates the loading of the American Express™ credit card into user 110's mobile wallet.

Further, in step 306, system 140 may execute software instructions that process the obtained account data, user profile data, and/or transaction data to identify one or more prospective financial products that are not currently held by user 110, but that may be of potential interest to user 110 based on the obtained account data, user profile data, and/or transaction data. By way of example, system 140 may determine, based on an analysis of the obtained transaction data records, that user 110 makes regular purchases at a local pharmacy (e.g., a CVS™ disposed proximate to user 110's home) using a credit card issued by TD Bank™. In some instances, system 140 may have a business relationship with CVS™, and may determine that a loyalty card issued by CVS™ may be of interest to user 110 and may be eligible for inclusion in user 110's mobile wallet. In other instances, system 140 may be configured to determine, based on the obtained transaction data records, that user 110 regularly purchases airline tickets using a credit card issued by TD Bank™, and may identify an alternate credit card issued by TD Bank™ that provides enhanced rewards for airline purchases for inclusion in user 110's mobile wallet.

The disclosed embodiments are, however, not limited to processes that identify financial products held by user 110 and/or of potential interest to user 110 within locally stored account data, user profile data, and transaction data. In some aspects, system 140 may obtain at least one of the account data, user profile data, and transaction data in steps 304 and 306 from data repositories 180 associated with third-party data providers 190 (e.g., a governmental entity, a credit reporting agency, a business entity issuing financial products, etc.). For example, in steps 304 and 306, system 140 may be configured to process a credit report of user 110 issued by a credit reporting agency (e.g., Experian™, TransUnion™, and/or Equifax™) to identify one or more financial products that are eligible for inclusion in user 110's mobile wallet.

In some embodiments, system 140 may execute software instructions that analyze the eligible financial information and determine whether the eligible financial product information includes information sufficient to load the eligible financial products into user 110's mobile wallet. In certain aspects, a mobile wallet application that establishes and administers user 110's mobile wallet may require one or more elements of information (e.g., a "threshold" amount of information) to load fully a particular financial product into user 110's mobile wallet for use in purchase transactions. By way of example, the threshold amount of information may include, for a credit or debit card, an account number associated with the credit or debit card, an expiration date, a corresponding card security code, and a full name and billing address of the card holder. In other instances, the threshold amount of information for a rewards or loyalty card may include, but is not limited to, an account number associated with the rewards or loyalty card and a full name of the card holder.

In some embodiments, system 140 may identify a portion of the eligible financial product information associated with a corresponding one of the eligible financial products (e.g., in step 308), and may determine whether the identified eligible financial product information includes the threshold amount of information (e.g., in step 310). If system 140 were to determine that the identified eligible financial product information includes at least the threshold amount of information (e.g., step 310; YES), system 140 may execute software instructions that determine whether additional eligible financial product information (e.g., associated with other eligible financial products) requires threshold analysis (e.g., in step 312). If system 140 were to determine that additional eligible financial product information requires threshold analysis (e.g., step 312; YES), then process 300 may pass back to step 308 and system 140 may perform the threshold analysis for the additional eligible financial product information.

If, however, system 140 were to determine that no additional eligible financial product information requires threshold analysis (e.g., step 312; NO), system 140 may execute software processes that output the eligible financial product information (e.g., in step 314). In some embodiments, system 140 may execute software instructions that tokenize and encrypt the outputted information for delivery to client device 104, as described below. Process 300 is then complete in step 316.

If, however, system 140 were to determine that the identified eligible financial product information does not include the threshold amount of information (e.g., step 310; NO), system 140 may identify one or more elements of information missing from the identified eligible financial product information (e.g., in step 318). By way of example, system 140 may identify an American Express™ credit card as an eligible financial product based on an obtained transaction record corresponding to a "pull" transaction initiated by one or more systems associated with American Express™. The obtained transaction record may, for example, include an account number associated with the American Express™ credit card, but may not specifically identify the corresponding expiration date, the corresponding card security code, or the billing address of user 110. In some aspects, system 140 may identify the expiration date, the card security code, and the billing address as missing information in step 318.

In step 320, system 140 may be configured to query one more locally accessible data repositories (e.g., data repository 144 and/or cloud-based data repository 170), and additionally or alternatively, systems associated with one or more external data providers (e.g., data repositories 180 of third-party data providers 190) to obtain at least a portion of the missing information. By way of example, in step 320, system 140 may execute software instructions to obtain a billing address associated with the American Express™ credit card from user profile data stored locally within data repository 144 and/or cloud-based data repository 170. Additionally or alternatively, system 140 may execute software instructions that query databases provided by one or more local, state, or Federal governmental agencies. By way of example, the database query may be delivered to a system associated with the local, state, or Federal governmental agencies across network 120 through a corresponding application programming interface (API) using any of the communication protocols outlined above.

In other aspects, the financial institution associated with system 140 may establish business relationships with one or more third-part entities, such as an issuer of a credit or debit card, an issuer of a rewards or loyalty card, and/or a credit reporting agency, from which system 140 may be configured to request at least a portion of the missing information in step 320. By way of example, the financial institution may establish a business relationship with American Express™ that facilitates information sharing and a cross-platform marketing of products. In some instances, in step 320, system 140 may request at least a portion of the missing information from databases and data repositories maintained by systems associated with American Express™. In other, system 140 may query databases and other data repositories maintained by systems associated with a credit reporting agency (e.g., Experian™, Equifax™, and/or TransUnion™) in step 320 to obtain at least a portion of the missing information. By way of example, the requests for missing information may be delivered to the third-party data providers (e.g., data repositories 180 of third-party data providers 190) through a corresponding application programming interfaces (APIs) using any of the communication protocols outlined above.

In certain aspects, and upon querying one or more of the locally accessible data repositories and third-party data providers (e.g., in step 320), system 300 may pass back to step 312, and system 140 may determine whether the information eligible financial product information requires the threshold analysis, as described above.

Referring back to FIG. 2, system 140 may execute software instructions that process the obtained eligible financial product information to generate an encrypted mobile wallet token (e.g., in step 212). In some embodiments, in step 212, system 140 may format the obtained eligible financial product information in accordance with one or more requirements of a corresponding mobile wallet application provided by system 140, and may encrypt the formatted information using a public key value specific to user 110 and to client device 104.

In certain aspects, system 140 may be configured to encrypt the formatted information in step 212 using a previously generated public key value, which system 140 may obtain from a locally accessible data repository (e.g., data repository 144 or cloud-based data repository 170). In other aspects, however, system 140 may generate the public key value based, for example, information identifying user 110 (e.g., a user name or user identifier) and/or information identifying client device 104 (e.g., a MAC address, an IP address, an International Mobile Equipment Identification (IMEI) number, and/or a Mobile Equipment ID (MEID) number). The disclosed embodiments are not limited to the symmetric key encryption schemes described above, and in additional embodiments, system 140 may encrypt the formatted information using any additional or alternate encryption scheme appropriate to the mobile wallet application, system 140, and/or client device 104 (e.g., an asymmetric key encryption scheme).

In an embodiment, and as described above, the information associated with a particular eligible financial product (e.g., a credit card, a debit card, and/or a rewards or loyalty card) may include at least a threshold amount of information identifying the particular eligible financial product. In certain aspects, and upon decrypting and unpacking of the mobile wallet token, client device 104 may be configured to "fully" load the particular financial product into user 110's mobile wallet, and the fully loaded financial product may be ready for use by user 110 in purchase transactions of good and/or services.

In other aspects, the information associated with a particular eligible financial product may fail to include the threshold amount of information for the particular financial product. By way of example, system 140 may determine that a rewards or loyalty card associated with a particular retailer may be of interest to user 110 based on transaction data identifying one or more purchase transactions made by user 110 at the particular retailer. In some embodiments, in step 212, system 140 may execute software instructions to encapsulate information identifying the rewards or loyalty card within the mobile wallet token, along with additional information that, upon processing by client device 104, enables client device 104 to fully provision the rewards or loyalty card within user 110's mobile wallet.

For instance, the additional information may enable client device 104 to establish a communications session with a computing system and/or data repository associated with an issuer of the rewards or loyalty card (e.g., the particular retailer) and obtain financial product information that would enable client device 104 to fully provision the rewards or loyalty card in user 110's mobile wallet. In other instances, the additional information may include a flag that, upon processing by client device 104, causes client device 104 to present a message (e.g., within a corresponding interface of a mobile wallet application) prompting user 110 to input into client device 104 financial product information that would enable client device 104 to fully provision the rewards or loyalty card.

Referring back to FIG. 2, system 140 may execute software instructions to store the mobile wallet token and a private key of user 110 in a data repository for subsequent retrieval and transmission to client device 104 (e.g., in step 214). By way of example, system 140 may be configured to store the mobile wallet token and the private key in cloud-based storage (e.g., cloud-based data repository 170), and link the stored mobile wallet token and the public key to information identifying user 110 (e.g., a user name, user identifier, etc.) and/or information identifying client device 104 (e.g., a MAC address, an IP address, an IMEI number, and/or a MEID number). Upon successful cloud storage of the mobile wallet token and private encryption key in step 214, exemplary process 200 is then complete in step 216.

In certain embodiments, the stored mobile wallet token, and additionally or alternatively, the stored private encryption key, may be associated with corresponding periods of validity, and as such, may "expire" at some time subsequent to their generation by system 140 and storage within cloud-based data repository 170. By way of example, the stored mobile wallet token and/or the stored private encryption key may expire at a predetermined time after cloud-based storage (e.g., twelve hours, one day, one week, etc.), and the predetermined time may by established by system 140 or cloud-based data repository 170 in accordance with one or more rules of the financial institution. In other instances, system 140 or cloud-based data repository 170 may be configured to render invalid the stored mobile wallet token and/or the stored private encryption key in response to one or more events, such as a detection of fraudulent activity.

For instance, upon expiration of the stored mobile wallet token, system 140 may execute software instructions that process account data, user profile data, and/or transaction data associated with user 110 to obtain information identifying one or more additional financial products eligible for inclusion in user 110's mobile wallet, and currently held by user 110 and/or financial products of potential interest to user 110. In some aspects, and as described above, system 140 may execute software instructions that process the obtained information identifying the additional eligible financial products and generate an updated encrypted mobile wallet token, which may be stored within cloud-based data repository 170 for subsequent retrieval by client device 104, as described below. Further, in additional aspects, and upon expiration of the stored private encryption key, system 140 may be configured to generated a new version of the private encryption key (e.g., "refresh" the private encryption key) using any of the techniques outlined above.

As described above, client device 104 may be configured to execute a mobile wallet application (e.g., a mobile "app") provided by a financial institution (e.g., business entity 150 associated with system 140). As described above, client device 104 may, upon execution of the mobile wallet application, obtain an encrypted mobile wallet token and corresponding private key stored within a cloud-based data repository (e.g., cloud-based data repository 170), decrypt and unpack the encrypted mobile wallet token to obtain information identifying one or more eligible financial products, and provision a mobile wallet associated with user 110 based on the obtained eligible financial product information, and additionally or alternatively, on information obtained from user 110 and/or information obtained from one or more third-party data providers (e.g., issuers of one or more credit cards, rewards cards, and/or loyalty cards).

In certain embodiments, and in response to the successful generation and cloud-based storage of a requested mobile wallet token using the exemplary processes outlined above, system 140 may execute software instructions to generate a message providing user 110 with instructions for obtaining the mobile wallet application (e.g., a mobile "app" provided by the financial institution), and to provide the generated message to client device 104 using one or more of the communications outlined above. By way of example, system 140 may be configured to access user profile data associated with user 110 (e.g., stored within data repository 144), and determine a mode of communication preferred by user 110. In some aspects, the preferred mode of communication may include electronic messaging using an email address specified in the user profile data, or a SMS or MMS text message transmitted to a specified mobile telephone number. System 140 may, for example, be configured to transmit the generated message across network 120 using the mode of communications preferred by user 110. In other aspects, however, system 140 may transmit the generate message to client device 102 across network 120 using any additional or alternate mode of communication appropriate to network 120, e.g., a default mode of communication specified by the financial institution.

Client device 104 may, for example, receive the message from system 140, and render the received message and present the instructions for obtaining the mobile wallet application to user 110. In some instances, the presented instructions may include a hyperlink that, upon selection by user 110, may enable user 110 to access a web page or other digital portal associated with the financial institution and initiate download and installation of the mobile wallet application on client device 104 (e.g., as provided by system 140). In other instances, the presented instructions may enable user 110 to access a web page or digital portal of an electronic retailer (e.g., an "app" store), which may enable user 110 to download and install the mobile wallet application on client device 104.

Further, in additional aspects, user 110 may, via client device 104 access the web page or digital portal associated with the financial institution or electronic retailer to initiate download and installation of the mobile wallet application on client device 104 prior to or absent presentation of the instructions (e.g., in response to an electronic advertisement). In other aspects, user 110 may represent an existing customer of the financial institution, and may thus have previously downloaded and installed the mobile wallet application on client device 104. Once downloaded, client device 104 may execute the mobile wallet application, which may establish the mobile wallet on client device 104, as described below in reference to FIG. 4.

Figure 4:
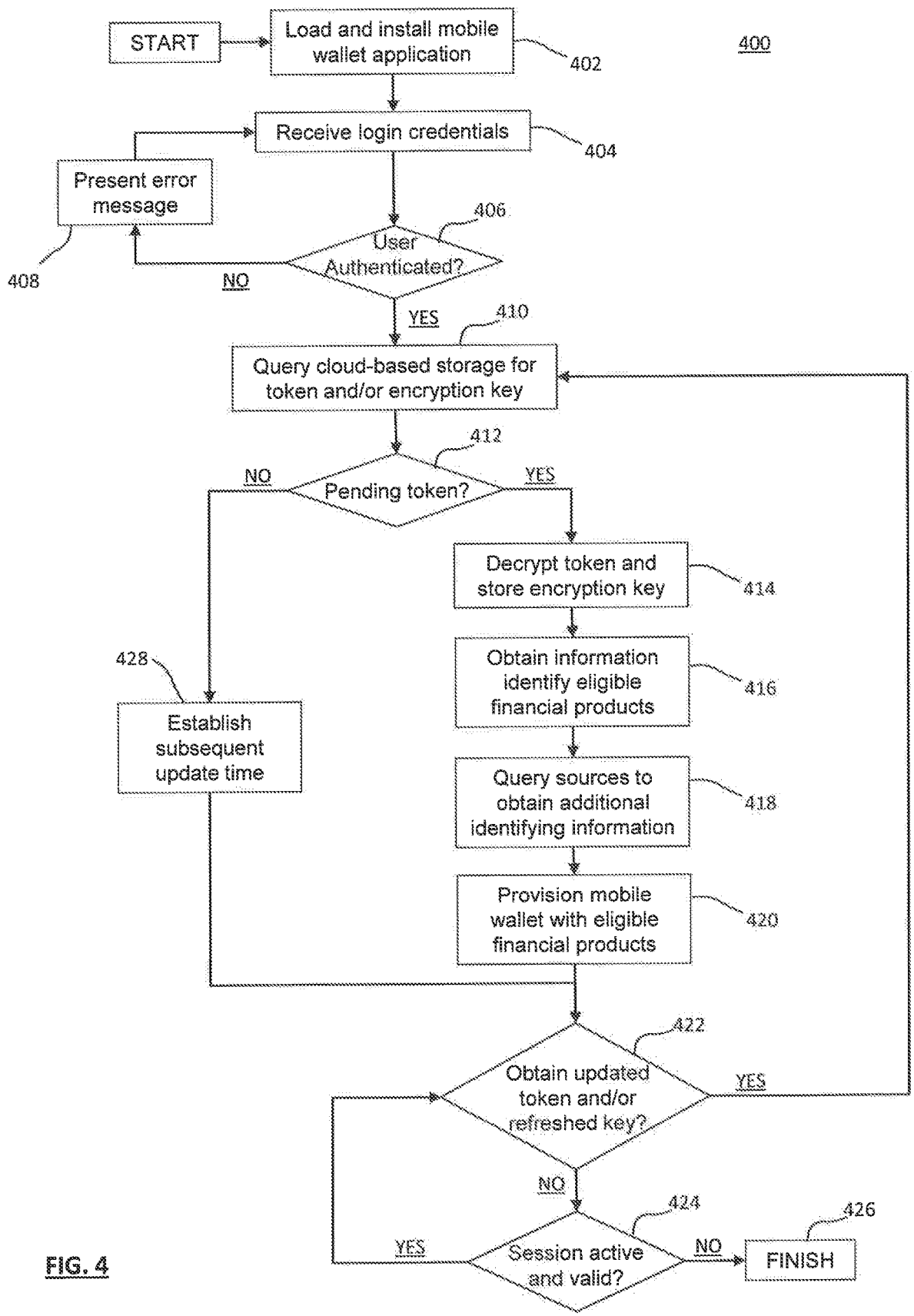
FIG. 4 is a flowchart of an exemplary process for loading a mobile wallet with eligible financial products, consistent with disclosed embodiments

FIG. 4 illustrates an exemplary process 400 for loading a mobile wallet with new or updated eligible financial products, in accordance with disclosed embodiments. In one embodiment, a device associated with a user (e.g., client device 104 of user 110) may execute a mobile wallet application (e.g., a mobile "app" provided by a financial institution) that, upon successful authentication of user 110, may query a cloud-based storage (e.g., cloud-based data repository 170) for an updated encrypted mobile wallet token and private encryption key associated with user 110 and/or client device 104. If cloud-based data repository 170 includes the encrypted mobile wallet token (and additionally or alternatively, a refreshed version of a corresponding encryption key), client device 104 may access updated encrypted mobile wallet token, and execute software instructions to decrypt and process the encrypted mobile wallet token to obtain information identifying one or more financial product eligible for inclusion within a mobile wallet of user 110. Client device 104 may, in some aspects, be configured to execute software instructions that provision user 110's mobile wallet based on the obtained eligible financial product information, and further, based on additional information input into client device 104 by user 110 and/or obtained from a third-party data provider (e.g., systems or data repositories associated with an issuer of an eligible financial product.

Referring to FIG. 4, client device 104 may be configured to execute software instructions that obtain and subsequently install the mobile wallet application on client device 104 (e.g., in step 402). In some aspects, user 110 may, via client device 104, access a web page or other digital portal associated with the financial institution and initiate download and installation of the mobile wallet application on client device 104 (e.g., as provided by system 140). In other instances, user 110 may, via client device 104, access a web page or digital portal of an electronic retailer (e.g., an "app" store), which may enable user 110 to download and install the mobile wallet application on client device 104.

In certain aspects, client device 104 may be configured to execute the installed mobile wallet application (e.g., in response to a request from user 110, and receive one or more login credentials associated with user 110 (e.g., in step 404). The login credentials may include, but are not limited to, a user name, a password, and/or an additional unique identifier associating the financial institution and user 110 (e.g., a PIN). Further, in some instances, client device 104 may be configured to present a login prompt or screen to user 110 within a graphical user interface (GUI) associated with the mobile wallet application, and the presented login prompt or screen may request that user 110 provide login credentials as input to client device 104.

Upon receipt of the login credentials, client device 104 may authenticate user 110 in step 406 by comparing the received login credentials against stored authentication information associated with one or more authenticated users (e.g., within data repository 144). If client device 104 fails to authenticate user 110 (e.g., step 406; NO), client device 104 may be configured to generate and present an error message to user 110 indicating the failed authentication (e.g., in step 408). By way of example, the message may specify that client device 104 failed to recognize a provided login credential, and additionally or alternatively, may provide a link enabling user 110 to obtain or reset an unknown login credential. Process 400 may then pass back to step 404, and in some aspects, client device 104 may be configured to await receipt of additional login credentials from user 110.

If, however, client device 104 were to authenticate user 110 (e.g., step 406; YES), client device 104 may query cloud-based storage (e.g., cloud-based data repository 170) to obtain a pending encrypted mobile wallet token and corresponding private encryption key (e.g., in step 410). By way of example, in step 410, client device 104 may transmit, to cloud-based data repository 170 across network 120, information identifying user 110 and additionally or alternatively, client device 104.

As described above, cloud-based data repository 170 may be configured to store a plurality of encrypted mobile wallet tokens associated with corresponding users of the mobile wallet service. By way of example, the stored mobile wallet tokens may be linked to information identifying a user (e.g., a user name, etc.) and information identifying a corresponding client device (e.g., an IP address, a MAC address, an MEID number, or an IMEI number). In some aspects, a computing system or server associated with cloud-based data repository 170 may receive the transmitted information and determine whether a corresponding one of the stored encrypted mobile wallet tokens is associated with user 110 and/or client device 104.

If cloud-based data repository 170 stores a pending encrypted mobile wallet token associated with user 110 and/or client device 104, the computing system or server may package the pending encrypted mobile wallet token and corresponding private encryption key as a response to the query, which may be transmitted to client device 104 across network 120. Alternatively, if cloud-based data repository 170 does not store a pending encrypted mobile wallet token associated with user 110 and/or client device 104, the computing system or server may transmit information indicating the lack of the pending encrypting mobile wallet token to client device 104 as the response to the query.

Referring back to FIG. 4, client device 104 may receive the response to the query from cloud-based data repository 170, and may be configured to execute software instructions that parse the received response to determine whether cloud-based data repository 170 includes a pending mobile wallet token associated with user 110 and/or client device 104 (e.g., in step 412). If the received response includes the pending mobile wallet token and the corresponding private encryption key (e.g., step 412; YES), client device 104 may be configured to store the private encryption key in a locally accessible storage device, and may decrypt the pending mobile wallet token using a combination of the received private encryption key and a corresponding public encryption key stored locally at client device 104 (e.g., in step 414).

In certain aspects, client device 104 may execute software instructions that process the decrypted mobile wallet token to obtain information identifying one or more financial products eligible for inclusion in a mobile wallet associated with user 110 and maintained at client device 104 (e.g., in step 416). In some instances, the eligible financial product information associated with a particular financial product (e.g., a credit card, a debit card, and/or a rewards or loyalty card) may include at least a predetermined amount of information (e.g., a threshold amount of information) enabling client device 104 to "fully" load the particular financial product into user 110's mobile wallet.

In other instances, however, the eligible financial product information associated with a particular financial product may include only a portion of the predetermined information enabling client device 104 to "fully" load the particular financial product into user 110's mobile wallet. In certain aspects, and in addition to the portion of the predetermined information, the eligible financial product information may also specify a source (e.g., a URL or IP address) of additional information that, when retrieved by client device 104, may enable client device 104 to "fully" load the particular financial product into user 110's mobile wallet. By way of the example, the source of the additional information may include, but is not limited to, user 110, the financial institution associated with system 140, and/or a third-party or business entity that issues of the particular financial instrument.

In some embodiments, client device 104 may be configured to execute software instructions that identify one or more sources of additional information within the obtained eligible financial product information, and that query the identified sources to obtain the additional information enabling client device 104 to fully load one or more of the eligible financial products into user 110's mobile wallet (e.g., in step 418). By way of example, client device 104 may determine the obtained information associated with an eligible credit card includes a full cardholder name and account number, but fails to include an expiration date and a card security code that would enable client device 104 to fully load the eligible credit card into user 110's mobile wallet. In some aspects, in step 418, client device 104 may be configured to parse the obtained information to identify a source for the missing expiration date and card security code (e.g., an IP address of a server or data repository associated with an issuer of the credit card), and may obtain the missing expiration date and card security code from the issuer server or data repository across network 120.

Client device 104 may, in some embodiments, be configured to process the information identifying the eligible financial products (e.g., as obtained from the mobile wallet token) and the additional information (e.g., as obtained from the identified sources) to provision user 110's mobile wallet with the one or more eligible financial products (e.g., in step 420). In some aspects, and based on the information obtained from the mobile wallet token and the additional information obtained from the identified sources, client device 104 may be configured to "fully" load one or more financial products into user 110's mobile wallet, and the fully loaded financial products may be ready for use by user 110 in purchase transactions of goods and/or services. Alternatively, if client device 104 were unable to fully load a particular financial product based on the information obtained from the mobile wallet token and the identified sources, client device 104 may be configured to perform a partial load of the particular financial product into user 110's mobile wallet based on the available information. Further, in some instances, client device 104 may be configured to present indications of the fully and partially loaded financial products within a graphical user interface (GUI) of mobile wallet application, as described below in reference to FIG. 5.

Figure 5:
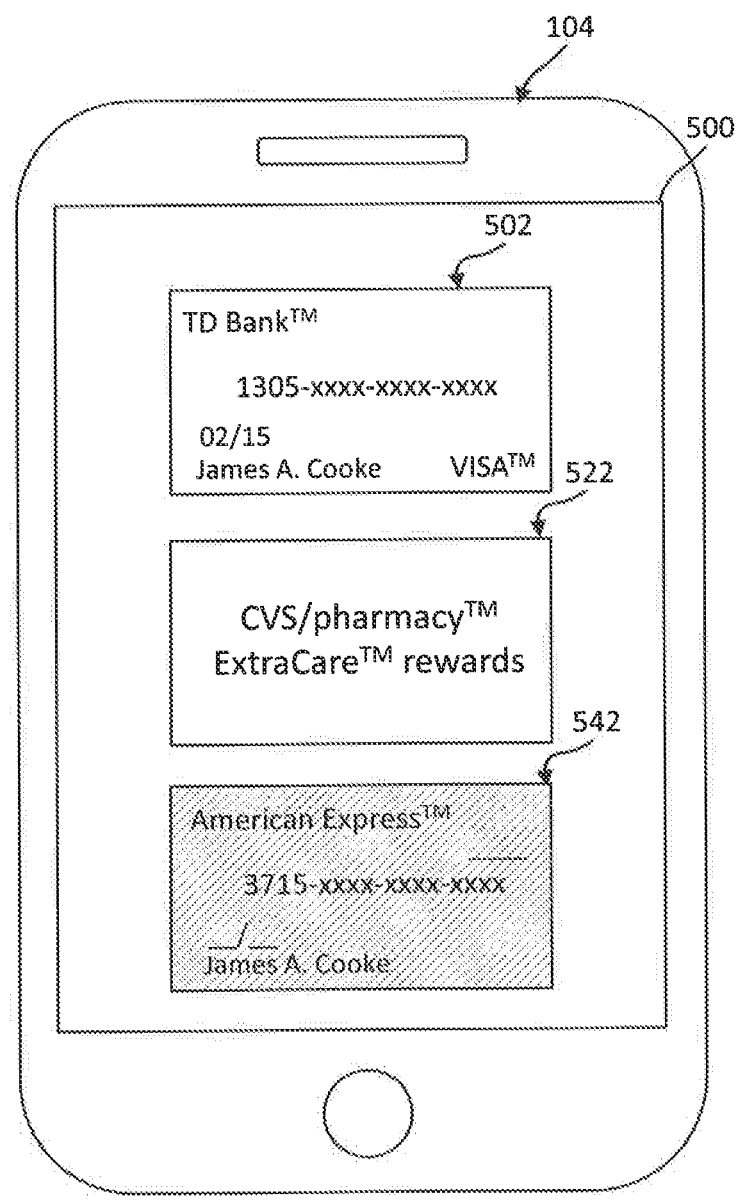
FIG. 5 illustrates an exemplary interface of a mobile wallet application, consistent with disclosed embodiments.

FIG. 5 illustrates an exemplary interface 500 for a mobile wallet application, in accordance with disclosed embodiments. In one embodiment, and as described above, client device 104 may be configured to decrypt and unpack a received mobile wallet token, further, to display within interface 500 indicators (e.g., indicators 502, 522, and 542) corresponding to financial products included within the received mobile wallet token.

In some embodiments, and as described above, the received mobile wallet token may include at least a threshold amount of information identifying a particular financial product (e.g., a credit card, a debit card, and/or a rewards or loyalty card). By way of example, upon decrypting and unpacking of the mobile wallet token, client device 104 may be configured to "fully" load the particular financial product into user 110's mobile wallet, and the fully loaded financial product may be ready for use by user 110 in one or more purchase transactions of good and/or services.

Referring to FIG. 5, interface 500 may present indicators 502 and 522 that are representative of financial products fully loaded into user 110's mobile wallet and capable of being utilized by user 110 for purchases of goods and/or services. By way of example, indicator 502 represents a Visa™ credit card issued by TD Bank™ and held in the name of user 110. Further, in some instances, the information loaded by client device 104 from the mobile wallet token into the mobile wallet application includes at least the threshold amount of information, e.g., the account number associated with the Visa™ credit card, the expiration date (e.g., "02/15"), a corresponding card security code (not depicted), and a full name and billing address of the card holder (e.g., "James A. Cooke").

Further, as illustrated in FIG. 5, indicator 522 represents an ExtraCare™ rewards card issued by CVS/Phramacy™ and provided to user 110. In some instances, user 110 may present the ExtraCare™ rewards card prior to purchasing goods from CVS/Pharmacy™ to obtain preferential discounts, and further, accrue points that may result in additional discounts. Although not depicted in FIG. 5, the information loaded by client device 104 from the mobile wallet token into the mobile wallet application includes at least the threshold amount of information for the ExtraCare™ rewards card, an account number associated with the rewards or loyalty card and a full name of the card holder.

In other embodiments, the received mobile wallet token may fail to include the threshold amount of information identifying a particular financial product (e.g., a credit card, a debit card, and/or a rewards or loyalty card) held by user 110, and additionally or alternatively, of potential interest to user 110. For example, and as described above system 140, may determine that user 110 holds an American Express™ credit card, based on transaction data records identifying a "pull" transaction in which a computer system associated with American Express™ initiates a funds transfer from a checking account of user 110. In certain aspects, as system 140 may determine, from the transaction data records and/or a third party data provider, an account number of the American Express™ credit card and a cardholder. System 140 may, however, be unable to identify the expiration date, the corresponding card security code, or the billing address of the card holder. Thus, in some instances, the information identifying the American Express™ credit card within the mobile wallet token may be "missing" information that would otherwise enable client device 104 to fully load the American Express™ credit card into user 110's mobile wallet.

In certain aspects, when the mobile wallet token fails to include the threshold amount of information for a corresponding financial product, and client device 104 is unable to obtain the missing information from one or more corresponding sources, client device 104 may be configured to perform a partial load of the corresponding financial product into user 110's mobile wallet. Further, in some instances, client device 104 may be configured to visually distinguish the displayed indicator of a partially loaded financial product from other fully loaded financial products (e.g., by shading the indicator, outlining the indicator with dashed or bold lines, changing a color of the indicator, or through any additional or alternate visual effect that distinguishes the partially loaded indicator from fully loaded indicator).

For example, as illustrated in FIG. 5, client device 104 may be configured to partially load the American Express™ credit card into user 110's mobile wallet, and to generate shaded indicator 542 that distinguishes the partially loaded American Express™ credit card from the fully loaded TD Bank™ Visa™ credit card and the ExtraCare™ rewards card. Further, in certain aspects, user 110 may be able to tap, click on, or otherwise select a portion of indicator 542 to input, into client device 104, the missing expiration date, corresponding card security code, and billing address to complete the loading of the American Express™ credit card into user 110's mobile wallet and render the American Express™ credit card usable for purchases vide the mobile wallet.

Referring back to FIG. 4, and subsequent to provisioning user 110's mobile wallet, client device 104 may be configured to determine whether cloud-based data repository 170 should be queried to obtain an updated mobile wallet token, and additionally or alternatively, a refreshed private encryption key (e.g., in step 422). In some aspects, client device 104 may be configured to query cloud-based data repository 170 for an updated mobile wallet token and/or a refreshed private encryption key at one or more pre-determined intervals established in conjunction with system 140 (e.g., every hour, two hours, twelve hours, or twenty-four hours), and additionally or alternatively, at intervals specified by user 110. Further, by way of example, the intervals may be established by the financial institution associated with system 140 to coincide with a conclusion of a period of validity associated with the mobile wallet tokens (e.g., an "expiration" of the mobile wallet tokens) stored in cloud-based data repository 170 and a time at which system 140 may generate updated mobile wallet tokens to replace the expired and stored mobile wallet tokens.

If client device 104 were to determine that cloud-based data repository 170 should be queried (e.g., step 422; YES), exemplary process 400 may pass back to step 410, and client device 104 may be configured to obtain the updated encrypted mobile wallet token and/or refreshed encryption key from cloud-based data repository 170) and provision user 110's mobile wallet using the techniques described above.

If, however, client device 104 were to determine that cloud-based data repository 170 should not be queried (e.g., step 422; NO), client device 104 may determine whether user 110's authenticated session of the mobile wallet application remains active and valid (e.g., in step 424). By way of example, client device 104 may render an authenticated session of the mobile wallet application inactive and invalid after expiration of a predetermine time period subsequent to an initial login and authentication of user 110, and additionally or alternatively, subsequent to user 110's last interaction with the mobile wallet application.

If client device 104 were to determine the authenticated mobile wallet application session to be active and valid (e.g., step 424; YES), exemplary process 400 may pass back to step 422, and client device 104 may determine whether to query cloud-based data repository for an updated mobile wallet token or refreshed private encryption key, as described above. Alternatively, if client device 104 were to determine the authenticated mobile wallet application session to be inactive and invalid (e.g., step 424; NO), then exemplary process 400 is complete in step 426.

Further, referring back to step 412, if cloud-based data repository 170 is determined not to include the pending mobile wallet token (e.g., step 412; NO), client device 104 may be configured to identify a subsequent time at which client device 104 should query cloud-based data repository 170 for an updated mobile wallet token or a refreshed private encryption key (e.g., in step 428). For example, in step 432, client device 104 may obtain a previously established time from a locally accessible storage device, and additionally or alternatively, may establish a time to query cloud-based data repository 170 based on one or more preferences of user 110 and/or requirements of system 140. In certain aspects, upon identification of the subsequent time, process 400 may pass forward to step 422, and client device 104 may determine whether cloud-based data repository 170 should be queried for an updated mobile wallet token and/or a refreshed private encryption key, as described above.

The disclosed embodiments obtain information identifying one or more financial products, such as credit card, debit cards, and rewards or loyalty cards, that are held by user 110 and/or of potential interest to user 110, and encapsulate the obtained information into a mobile wallet token, which may be unpacked by client device 104 and loaded into user 110's mobile wallet. The disclosed embodiments are, however, not limited to such exemplary financial products, and in other instances, system 140 may obtain information associated user 110 from various local, state, and Federal governmental entities (e.g., from data repositories 180 of third-party data providers 190). Using the exemplary processes described above, system 140 may, for example, process the obtained information to identifying not financial products, but governmental-issued forms of identified associated with user 110 (e.g., a driver's license, a visa, and/or a passport), which may be encapsulated into a mobile wallet token and transmitted to client device 104, and presented to user 110 through an interface of the mobile wallet application.

In other aspects, system 140 may obtain information associated user 110 from computing systems of one or more airlines (e.g., United™ and/or Air Canada™) and rail carriers (e.g., Amtrak™). Using the exemplary processes described above, system 140 may, for example, process the obtained information to identify documents and/or tickets associated with future travel, which system 140 may be encapsulated into a mobile wallet token and transmitted to client device 104, and presented to user 110 through an interface of the mobile wallet application. In further embodiments, system 140 may be configured to identify an encapsulate into a mobile wallet token any additional or alternate financial products, government-issued forms of identification, travel documents, and other information appropriate for presentation through an interface associated with a mobile wallet application executed by client device 104.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
    a communications unit;
    a memory storing instructions; and
    at least one processor coupled to the communications unit and the memory, the at least one processor being configured to execute the instructions to perform the steps of:
        obtaining provisioning information associated with a financial product, the financial product being eligible for provisioning into a mobile wallet administered by an application program executed at a device;
        when the provisioning information fails to include a predetermined threshold amount of provisioning information, generating an encrypted mobile wallet token using a public key of the device, the encrypted mobile wallet token including the provisioning information and an identifier of a third-party computing system that maintains at least the predetermined threshold amount of provisioning information; and
        storing the encrypted mobile wallet token and an associated private key in a data repository, and establishing, within the data repository, a link between the encrypted mobile wallet token, the associated private key, and an additional identifier of at least one of the device or a corresponding user, the data repository being accessible to the device over a communications network, and the device being configured to execute the application program to perform the steps of accessing the data repository, obtaining the encrypted mobile wallet token and the associated private key from the data repository based on the additional identifier, and using the associated private key, extracting the provisioning information and the identifier of a third-party computing system.

2. The apparatus of claim 1, wherein:
    the third-party computing system is accessible to the device across the communications network; and
    the execution of the application program causes the device to perform the steps of:
        based on the identifier, requesting and receiving at least the predetermined threshold amount of provisioning information from the third-party computing system; and
        performing operations that provision the financial product into the mobile wallet based on the extracted provisioning information and on at least the predetermined threshold amount of provisioning information.

3. The apparatus of claim 2, wherein the execution of the application program causes the device to perform the step of initiating a transaction involving the provisioned financial product based on the extracted provisioning information and on the predetermined threshold amount of provisioning information.

4. The apparatus of claim 1, wherein the executed instructions further cause the at least one processor to perform the steps of:
    receiving a request to obtain the application program from the device via the communications unit;
    in response to the received request, providing the application program to the device via the communications unit; and
    obtaining the provisioning information associated with the financial product in response to the received request.

5. The apparatus of claim 4, wherein the executed instructions further cause the at least one processor to transmit, to the device via the communications unit, data that causes the device to install the application program.

6. The apparatus of claim 1, wherein:
    the predetermined threshold amount of provisioning information facilitates the provisioning of the financial product into the mobile wallet administered by the application program executed at the device; and
    the executed instructions further cause the at least one processor to perform the step of determining that the provisioning information fails to include the predetermined threshold amount of provisioning information.

7. The apparatus of claim 1, wherein:
    the encrypted mobile wallet token is valid to provision the financial product into the mobile wallet during a corresponding temporal interval; and
    the executed instructions further cause the at least one processor to perform the steps of:
        determining that a current time falls outside of the corresponding temporal interval;
        when the current time is determined to fall outside of the corresponding temporal interval, obtaining additional provisioning information associated with an additional financial product eligible for inclusion within the mobile wallet;

generating an updated encrypted mobile wallet token based on the additional provisioning information; and encrypting and storing the updated encrypted mobile wallet token in the data repository.

8. The apparatus of claim 1, wherein:

the data repository is maintained by a computing system connected to the apparatus across the communications network; and the executed instructions further cause the at least one processor to perform a step of transmitting, via the communications unit, the encrypted mobile wallet token and the associated private key to the computing system, the computing system executing additional instructions to perform the step of storing the encrypted mobile wallet token and the associated private key within a portion of the data repository.

9. The apparatus of claim 1, wherein:

the financial product comprises a credit card account, a debit card account, or a pre-paid rewards or loyalty card; and the provisioning information comprises at least one of an account number, an expiration date, a card security code, information identifying a holder of the financial product, information identifying a billing address, or information identifying a shipping address.

10. The apparatus of claim 1, wherein the executed instructions further cause the at least one processor to perform the steps of:

obtaining transaction data identifying prior transactions associated with the device; and generating the provisioning information based on a portion of the transaction data, the portion of the transaction data identifying a subset of the prior transactions involving the financial product.

11. A computer-implemented method, comprising:

obtaining, using at least one processor, provisioning information associated with a financial product, the financial product being eligible for provisioning into a mobile wallet administered by an application program executed at a device;

when the provisioning information fails to include a predetermined threshold amount of provisioning information, generating, using the at least one processor, an encrypted mobile wallet token using a public key of the device, the encrypted mobile wallet token including the provisioning information and an identifier of a third-party computing system that maintains at least the predetermined threshold amount of provisioning information;

using the at least one processor, storing the encrypted mobile wallet token and an associated private key in a data repository, and establishing, within the data repository, a link between the encrypted mobile wallet token, the associated private key, and an additional identifier of at least one of the device of a corresponding user, the data repository being accessible to the device over a communications network, and the device being configured to execute the application program to perform the steps of accessing the data repository, obtaining the encrypted mobile wallet token and the associated private key from the data repository based on the additional identifier, and using the associated private key, extracting the provisioning information and the identifier of a third-party computing system.

12. The computer-implemented method of claim 11, wherein:

the third-party computing system is accessible to the device across the communications network; and the execution of the application program causes the device to perform the steps of:

based on the identifier, requesting and receiving at least the predetermined threshold amount of provisioning information from the third-party computing system; and performing operations that provision the financial product into the mobile wallet based on the extracted provisioning information and on at least the predetermined threshold amount of provisioning information.

13. The computer-implemented method of claim 11, wherein:

the computer-implemented method further comprises:

receiving a request to obtain the application program from the device;

in response to the received request, providing the application program to the device via the communications unit; and the obtaining comprises obtaining the provisioning information associated with the financial product additionally in response to the received request.

14. The computer-implemented method of claim 11, wherein:

the predetermined threshold amount of provisioning information facilitates the provisioning of the financial product into the mobile wallet administered by the application program executed at the device; and the computer-implemented method further comprises determining, using the at least one processor, that the provisioning information fails to include the predetermined threshold amount of provisioning information.

15. The computer-implemented method of claim 11, wherein:

the data repository is maintained by an additional computing system; and the computer-implemented method further comprises transmitting, using the at least one processor, the encrypted mobile wallet token and the associated private key to the additional computing system, the additional computing system executing additional instructions to perform the step of storing the encrypted mobile wallet token and the associated private key within a portion of the data repository.

16. The computer-implemented method of claim 11, further comprising:

obtaining, using the at least one processor, transaction data identifying prior transactions associated with the device; and using the at least one processor, generating the provisioning information based on a portion of the transaction data, the portion of the transaction data identifying a subset of the prior transactions involve the financial product.

17. The computer-implemented method of claim 11, wherein:

the encrypted mobile wallet token is valid to provision the financial product into the mobile wallet during a corresponding temporal interval; and the computer-implemented method further comprises:

determining, using the at least one processor, that a current time falls outside of the corresponding temporal interval;

when the current time is determined to fall outside of the corresponding temporal interval, obtaining, using the at least one processor, additional provisioning information associated with an additional financial product eligible for inclusion within the mobile wallet;

generating, using the at least one processor, an updated encrypted mobile wallet token based on the additional provisioning information; and using the at least one processor, encrypting and storing the updated encrypted mobile wallet token in the data repository.

18. A tangible, non-transitory computer-readable medium storing instructions that, when executed by at least one processor, cause the at least one processor to perform a method, comprising:

obtaining, using at least one processor, provisioning information associated with a financial product, the financial product being eligible for provisioning into a mobile wallet administered by an application program executed at a device;

when the provisioning information fails to include a predetermined threshold amount of provisioning information, generating, using the at least one processor, an encrypted mobile wallet token using a public key of the device, the encrypted mobile wallet token including the provisioning information and an identifier of a third-party computing system that maintains at least the predetermined threshold amount of provisioning information;

using the at least one processor, storing the encrypted mobile wallet token and an associated private key in a data repository, and establishing, within the data repository, a link between the encrypted mobile wallet token, the associated private key, and an additional identifier of at least one of the device of a corresponding user, the data repository being accessible to the device over a communications network, and the device being configured to execute the application program to perform the steps of accessing the data repository, obtaining the encrypted mobile wallet token and the associated private key from the data repository based on the additional identifier, and using the associated private key, extracting the provisioning information and the identifier of a third-party computing system.

19. The tangible, non-transitory computer-readable medium of claim 18, wherein:

the third-party computing system is accessible to the device across the communications network; and the method further comprises:

based on the identifier, requesting and receiving at least the predetermined threshold amount of provisioning information from the third-party computing system; and performing operations that provision the financial product into the mobile wallet based on the extracted provisioning information and on at least the predetermined threshold amount of provisioning information.

20. The tangible, non-transitory computer-readable medium of claim 18, wherein:

the encrypted mobile wallet token is valid to provision the financial product into the mobile wallet during a corresponding temporal interval; and the method further comprises:

determining, using the at least one processor, that a current time falls outside of the corresponding temporal interval;

when the current time is determined to fall outside of the corresponding temporal interval, obtaining, using the at least one processor, additional provisioning information associated with an additional financial product eligible for inclusion within the mobile wallet;

generating, using the at least one processor, an updated encrypted mobile wallet token based on the additional provisioning information; and using the at least one processor, encrypting and storing the updated encrypted mobile wallet token in the data repository.

* * * * *